(12) United States Patent
Hasegawa et al.

(10) Patent No.: US 7,224,374 B2
(45) Date of Patent: *May 29, 2007

(54) MONITORING SYSTEM AND METHOD, AND PROGRAM AND RECORDING MEDIUM USED THEREWITH

(75) Inventors: Hiroyuki Hasegawa, Kanagawa (JP); Hideki Hama, Tokyo (JP); Hiroshi Nedu, Chiba (JP); Takeyoshi Kuroya, Shizuoka (JP); Masaaki Kurebayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 443 days.

This patent is subject to a terminal disclaimer.

(21) Appl. No.: 10/427,877

(22) Filed: May 1, 2003

(65) Prior Publication Data

US 2004/0002984 A1 Jan. 1, 2004

(30) Foreign Application Priority Data

| May 2, 2002 | (JP) | ............................ 2002-131025 |
| May 2, 2002 | (JP) | ............................ 2002-131026 |

(51) Int. Cl.
*G06T 11/00* (2006.01)
(52) U.S. Cl. ..................................... 345/676
(58) Field of Classification Search ................. 345/676
See application file for complete search history.

(56) References Cited

U.S. PATENT DOCUMENTS 6,091,771 A 7/2000 Seeley et al. ............... 375/240

6,466,254 B1 * 10/2002 Furlan et al. ................. 348/36
6,624,846 B1 9/2003 Lassiter
2003/0071891 A1 4/2003 Geng

FOREIGN PATENT DOCUMENTS

| EP | 0 878 965 | 11/1998 |
| EP | 1 158 473 | 11/2001 |
| EP | 1 162 830 | 12/2001 |
| JP | 5 242167 | 9/1993 |
| JP | 9 233384 | 9/1997 |
| JP | 10 164563 | 6/1998 |
| JP | 10-290387 | 10/1998 |
| JP | 10-290412 | 10/1998 |
| JP | 11-8845 | 1/1999 |
| JP | 11-88767 | 3/1999 |
| JP | 11 252534 | 9/1999 |
| JP | 2000-224542 | 8/2000 |
| JP | 2001-251607 | 9/2001 |
| JP | 2001 325695 | 11/2001 |

* cited by examiner

*Primary Examiner*—Almis R. Jankus
(74) *Attorney, Agent, or Firm*—Frommer Lawrence & Haug LLP; William S. Frommer; Paul A. Levy

(57) ABSTRACT

A monitoring system includes a picture capturing unit, a storage unit for storing original images composed of still images captured by said picture capturing unit, or a compressed images composed of compressed still images generated by compressing the still images, an image display unit, a designating unit for designating a region in an image displayed on the image display unit, and a control unit. The control unit controls said image display unit to display a panoramic entire image composed of the stored original images or compressed images, and updates only an image in the designated region in the entire image.

26 Claims, 13 Drawing Sheets

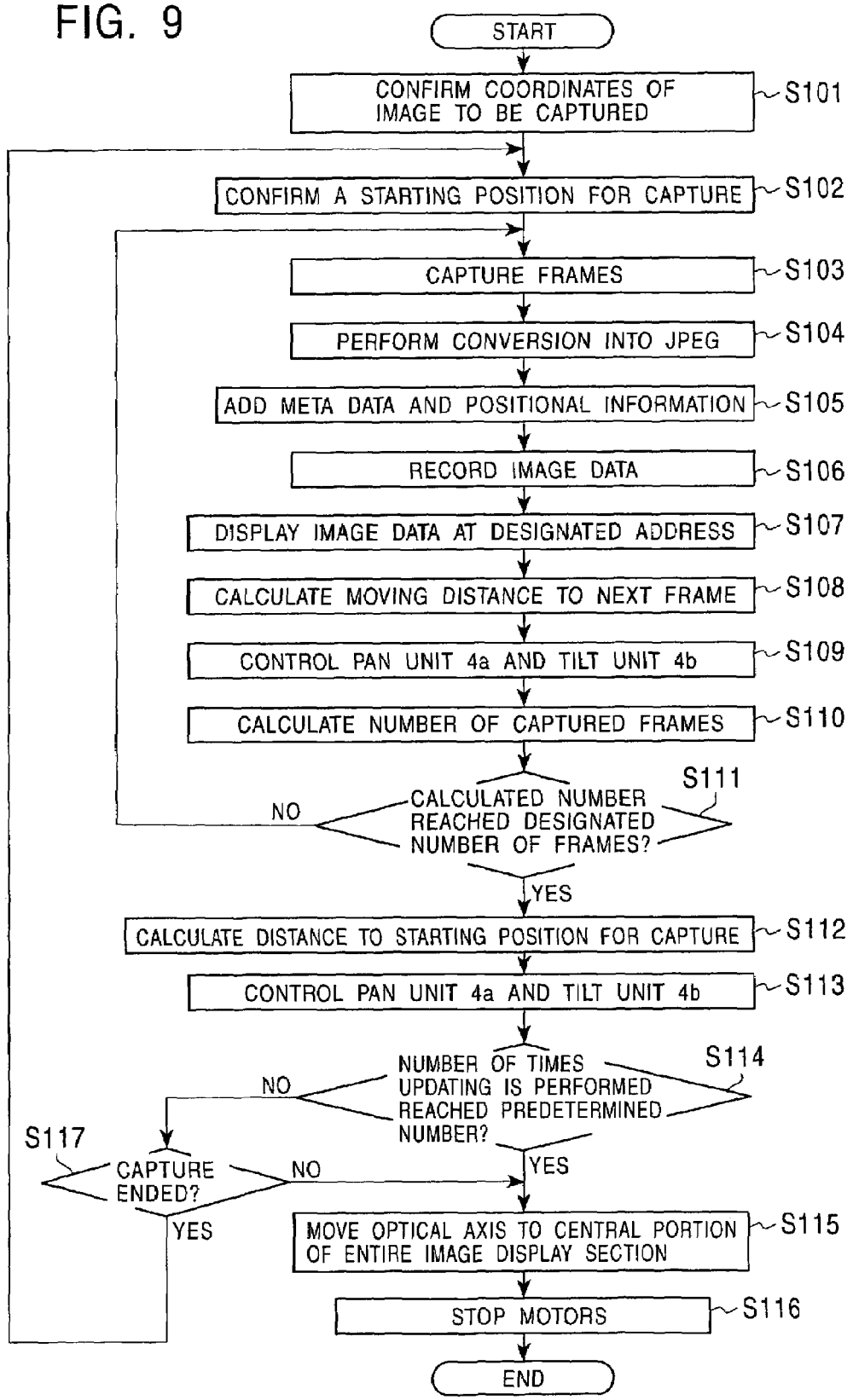

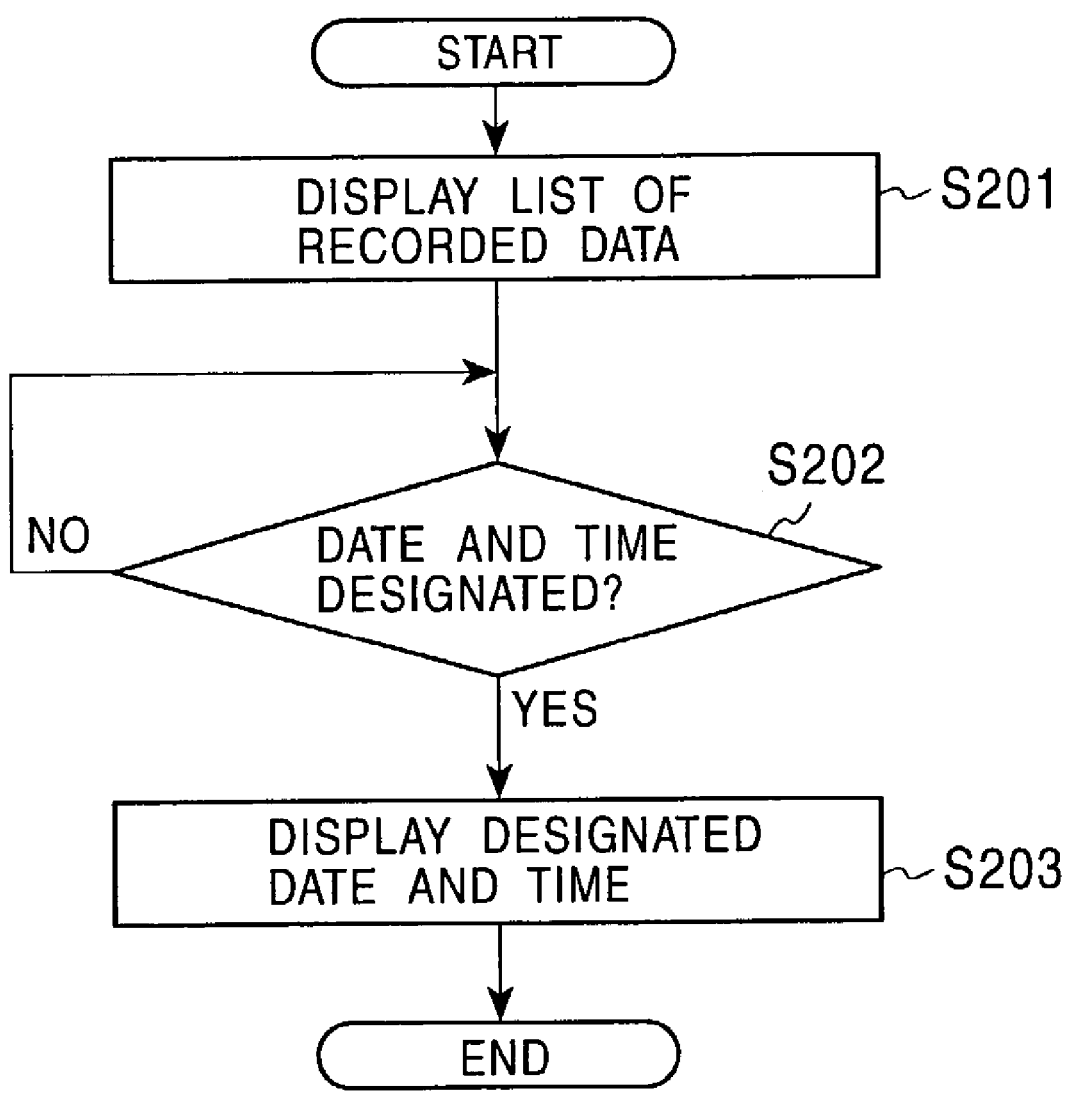

MONITORING SYSTEM AND METHOD, AND PROGRAM AND RECORDING MEDIUM USED THEREWITH

BACKGROUND OF THE INVENTION

1. Field of the Invention

The present invention relates to a monitoring system and method applied to monitoring cameras, etc., and a program and a recording medium which are used with the system and method.

2. Description of the Related Art

Monitoring systems have conventionally been used for monitoring situations in wide areas. For example, monitoring systems have been used for sea surveillance, river surveillance, restricted area monitoring, wild animal behavior observation, etc. Since pictures of a wide area must be captured, a video camera having a very large number of pixels has been used. Accordingly, the system price is expensive, thus causing a problem in cost. Unlike this type of system, a method has been proposed in which, by capturing still images while sequentially shifting capturing ranges of a camera, and connecting the images, an image in a monitored area is generated. In this method, an extremely high-resolution image can be obtained as an entire image. Thus, when a portion of the entire image is obtained as an enlarged image, the enlarged image itself has a high resolution and is clear. Also, in the above monitoring system, not only captured images can be monitored in real time, but also images captured in the past can be monitored, with the captured images stored in a memory. Moreover, by monitoring the images captured in the past, and analyzing each image, the cause of, for example, a particular event, such as an accident or a disaster, can be clarified.

Nevertheless, the monitoring systems of the related art have a poor operability in that it takes a long time to read and display images stored in the memory. This is because the amount of data per image is very large since each image for image analysis must have a high resolution and clearness.

In addition, it is difficult for the above monitoring systems to monitor a moving object such as a wild animal. This is because it is difficult to shorten intervals at which an image displayed on a display is updated since the data capacity of images is very large. In the monitoring system of the related art, not only captured images can be displayed, but also the captured images can be recorded on a recording medium, and can be transferred to a personal computer through a network. However, since the data capacity of the images is very large, it takes a very long time to perform a process for transferring the captured images from the monitoring system to the personal computer through the network. Also, a process for the monitoring system for recording the captured images on the recording medium, and a process for the personal computer for reading images from the recording medium each require a very long time.

SUMMARY OF THE INVENTION

It is an object of the present invention to provide a monitoring system and method in which intervals at which a displayed image is updated are shortened, and a program and a recording medium which are used with the monitoring system and system.

It is another object of the present invention to provide a monitoring system and method in which the data capacity of images is reduced, and program and a recording medium which are used with the monitoring system and system.

According to a first aspect of the present invention, a monitoring system is provided which includes a picture capturing unit for performing picture capturing, a storage unit for storing a plurality of original images including a plurality of still images captured by the picture capturing unit, or a plurality of compressed images including compressed still images generated by compressing the still images, an image display unit for performing image display, a designating unit for designating a region in an image displayed on the image display unit, and a control unit for controlling the image display unit to display a panoramic entire image including the stored original images or compressed images, and updating an image in the designated region in the entire image by an image having a capturing time different from the capturing time of each of images other the image in the designated region.

According to a second aspect of the present invention, a monitoring method is provided which includes a picture capturing step for performing picture capturing, a storage step for storing a plurality of original images including a plurality of still images captured in the picture capturing step, or compressed images including compressed still images generated by compressing the still images, a display step for displaying a panoramic entire image including the original images or compressed images stored in the storage step, a designating step for designating a particular region in the entire image displayed in the display step, and an updating step for updating the image in the region designated in the designating step by an image having a capturing time different from the capturing time of each of images other the image in the designated region.

According to a third aspect of the present invention, a program is provided which causes a computer to execute a picture capturing step for performing picture capturing, a storage step for storing a plurality of original images including a plurality of still images captured in the picture capturing step, or compressed images including compressed still images generated by compressing the still images, a display step for displaying a panoramic entire image including the original images or compressed images stored in the storage step, a designating step for designating a particular region in the entire image displayed in the display step, and an updating step for updating the image in the region designated in the designating step by an image having a capturing time different from the capturing time of each of images other the image in the designated region.

According to a fourth aspect of the present invention, a recording medium having a recorded program is provided. The program causes a computer to execute a picture capturing step for performing picture capturing, a storage step for storing a plurality of original images including a plurality of still images captured in the picture capturing step, or compressed images including compressed still images generated by compressing the still images, a display step for displaying a panoramic entire image including the original images or compressed images stored in the storage step, a designating step for designating a particular region in the entire image displayed in the display step, and an updating step for updating the image in the region designated in the designating step by an image having a capturing time different from the capturing time of each of images other the image in the designated region.

According to a fifth aspect of the present invention, a monitoring system is provided which includes a picture capturing unit for performing picture capturing, a storage unit for storing image data, an image display unit for performing image display, a designating unit for designating a region in the image displayed on the image display unit, and a control unit for controlling the image display unit to display a panoramic entire image including a plurality of still images captured by the picture capturing unit, and for controlling the picture capturing unit in accordance with the designated region to capture still images in a position corresponding to the designated region and displaying, in the designated region, an image generated from the still images captured in the position.

According to a sixth aspect of the present invention, monitoring method is provided which includes a picture capturing step for performing picture capturing, a display step for displaying a panoramic entire image including a plurality of still images captured in the picture capturing step, a designating step for designating a particular region in the entire image displayed in the display step, and a control step for controlling a picture capturing unit in accordance with the particular region designated in the designating step to capture still images in a position corresponding to the designated region, and displaying, in the designated region, an image generated from the still images captured in the position.

According to a seventh aspect of the present invention, a program is provided which causes a computer to execute a picture capturing step for performing picture capturing, a display step for displaying a panoramic entire image including a plurality of still images captured in the picture capturing step, a designating step for designating a particular region in the entire image displayed in the display step, and a control step for controlling a picture capturing unit in accordance with the particular region designated in the designating step to capture still images in a position corresponding to the designated region, and displaying, in the designated region, an image generated from the still images captured in the position.

According to an eighth aspect of the present invention, a recording medium having a recorded program is provided. The program causes a computer to execute a picture capturing step for performing picture capturing, a display step for displaying a panoramic entire image including a plurality of still images captured in the picture capturing step, a designating step for designating a particular region in the entire image displayed in the display step, and a control step for controlling a picture capturing unit in accordance with the particular region designated in the designating step to capture still images in a position corresponding to the designated region, and displaying, in the designated region, an image generated from the still images captured in the position.

According to the present invention, a storage unit stores original images including a plurality of still images captured by a picture capturing unit or compressed images including compressed still images generated by compressing the still images. A display unit displays a panoramic entire image generated from the stored original images or compressed images. A still image or compressed image corresponding to a region designated in the displayed entire image is read from the storage unit and is displayed. Thus, only an image in a particular region in the entire image can be updated.

According to the present invention, an image display unit displays a panoramic entire image including a plurality of still images captured by a picture capturing unit. The picture capturing unit is controlled in accordance with a region designated in the entire image by a designating unit. Still pictures are captured in a position corresponding to the designated region, and an image generated from the still images captured in the position is displayed in the designated region. Therefore, only a desired region in the panoramic entire image can be updated. Thus, intervals at which the image is updated can be shortened.

According to the present invention, only an image in a particular region in the entire image can be displayed. Therefore, the operability of analyzing images in a monitoring system can be improved.

In addition, only a desired region in a panoramic entire image can be updated. Thus, time intervals at which the image is updated can be shortened.

BRIEF DESCRIPTION OF THE DRAWINGS

FIG. 9 is a flowchart illustrating an operation of the entire-image display section 102 which captures frames of an entire image according to one embodiment of the present invention;

FIG. 10 is a flowchart illustrating a process for playing back stored image data in the other embodiment of the present invention;

DESCRIPTION OF THE PREFERRED EMBODIMENTS

Embodiments of the present invention are described below with reference to the accompanying drawings.

Figure 1:
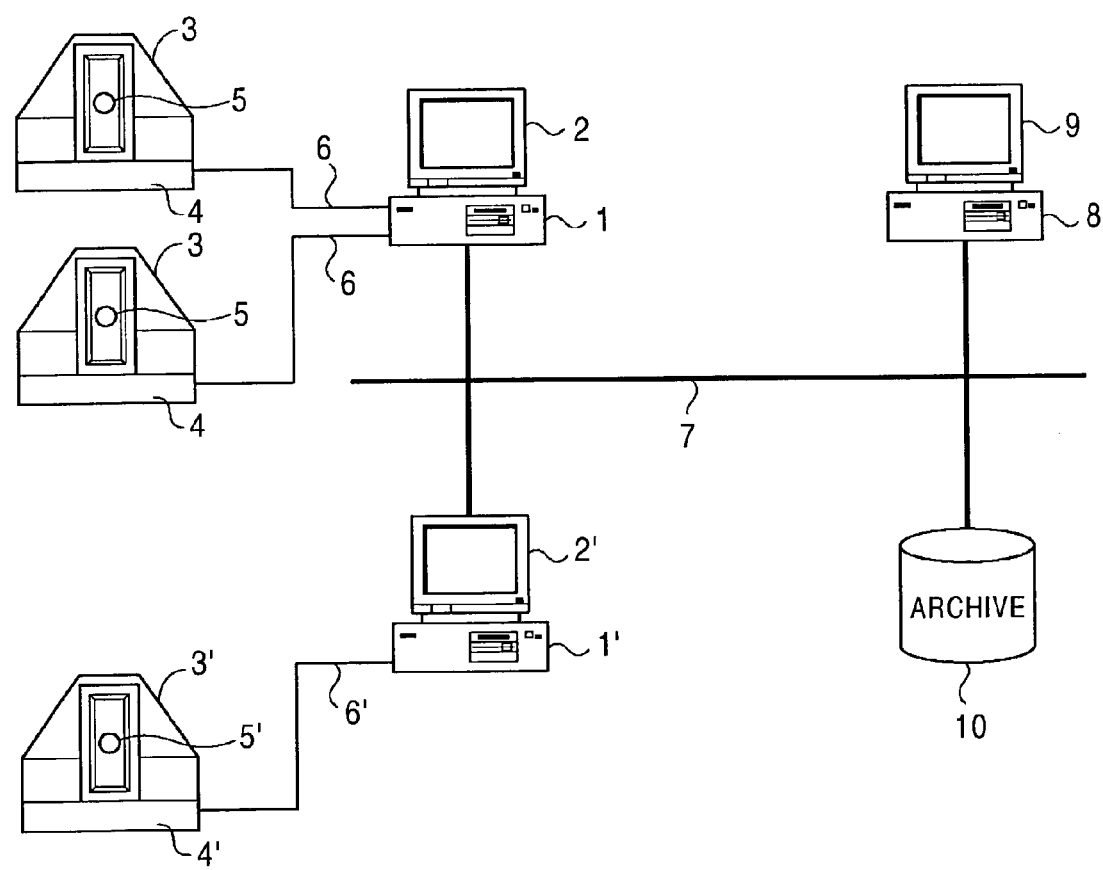
FIG. 1 is a block diagram showing a monitoring system according to an embodiment of the present invention.

FIG. 1 shows the schematic structure of an embodiment of the present invention. A computer 1 connecting to a display 2 controls camera units 3. FIG. 1 shows an example of a system in which one computer 1 controls two camera units 3, and a computer 1' having a display 2' controls another camera unit 3'. In this system, one computer can control a plurality of camera units.

Each camera unit 3 is formed by integrating a pan-tilter section 4 and a camera section 5. The camera unit 3 is installed so as to capture pictures of a remote target area. For example, the camera section 5 includes a telephoto lens of 10 or 70 magnifications, etc, and can capture pictures of a place located several tens of meters to several kilometers away.

The camera section 5 is, for example, a digital still camera that can switch on a shutter in synchronization with an external trigger. Its picture-capture device, for example, a CCD has the number of pixels of a standard such as the VGA (Video Graphics Array) having a resolution of 640 by 480 pixels, XGA (Extended Graphics Array) having a resolution of 1024 by 768 pixels, or SXGA (Super Extended Graphics Array) having a resolution of 1280 by 1024 pixels. A VGA picture-capture device outputs picture data at a rate of 30 frames/second (fps). An XGA picture-capture device outputs picture data at a rate of 15 fps. An SXGA picture-capture device outputs picture data at a rate of 7.5 fps.

Video data is transmitted from the camera unit 3 to the computer 1 by a bus 6. The bus 6 is used as a video-data transmission path and is used to transmit a control signal for the camera unit 3. The above structure similarly applies to the computer 1' and the camera unit 3'.

Each of the computers 1 and 1' stores, in its memory, video data from each of the camera units 3 and 3'. As is described later, each of the computers 1 and 1' creates a graphical user interface (GUI) for operation, and can control each of the camera units 3 and 3' to capture pictures of a target area desired by a user. The captured pictures are compressed by using, for example, JPEG (Joint Photographic Experts Group).

The computers 1 and 1' are connected to each other by a local area network (LAN) 7. Another computer 8 is connected to the LAN 7. The computer 8 has a display 9. The computer 8 receives picture data, etc., from the computers 1 and 1' through the LAN 7, stores the picture data in an archive 10, and processes the picture data. For example, the picture data is used to perform face recognition, baggage recognition, car recognition, etc. The archive 10 is one that can store large amounts of data, such as a tape streamer.

Figure 2:
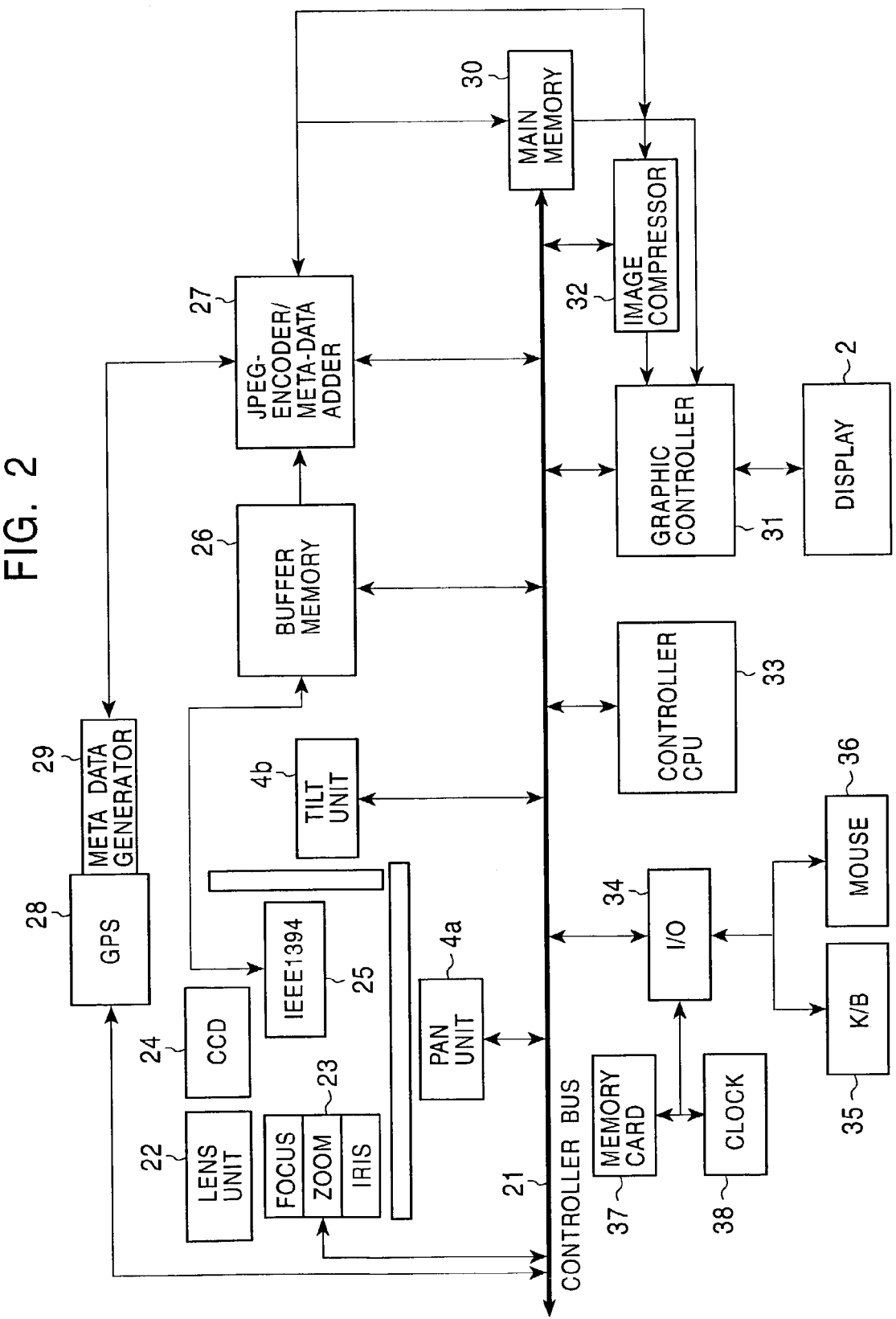
FIG. 2 is a detailed block diagram showing a computer and a camera unit in the monitoring system shown in FIG. 1.

FIG. 2 is a detailed block diagram showing the camera 1 and the camera unit 3 in the above monitoring system. In the diagram in FIG. 2, the components of the computer 1 and the camera unit 3 are connected to a common controller bus 21.

The pan-tilter section 4 includes a pan portion 4a and a tilt portion 4b. The pan portion 4a and the tilt portion 4b each have a stepping motor. In response to a control signal supplied from a controller CPU (central processing unit) through the controller bus 21, the pan portion 4a causes the camera unit 3 to pan, or the tilt portion 4b tilts the camera unit 3. On the pan-tilter section 4 is provided the camera section 5. Here, the word "pan" means horizontally rotating the camera unit 3, and the word "tilt" vertically rotating the camera unit 3. By way of example, the maximum pan angle is set at 180 degrees, and the maximum tilt angle is set at 50 degrees.

As is described later, the camera unit 3 is moved in its maximum movable range, and in the range of tilt angles of ±15 degrees and the range of pan angles of ±50 degrees. Whenever the center of picture capturing is moved for an angle of view, the shutter is switched on to capture still images (hereinafter referred to also as "frames"). In the case of M (e.g., 8) vertical frames and N (e.g., 16) horizontal frames, a total of (M×N=8×16=) 128 frames are sequentially captured, and the 128 frames are compressed and connected to one another to form an entire image. Each frame is, for example, an XGA image having a resolution of 1024 by 768 pixels. Thus, the 128 frames constitute an image composed of approximately one hundred million pixels (having (1024× 16=) 16384 horizontal pixels by (768×8=) 6144 vertical pixels) when overlapping portions are ignored. Capturing the 128 frames requires approximately 5 seconds. Each overlapping portion has, for example, 16 vertical pixels and 16 horizontal pixels.

The camera unit 3 has a digital camera structure, and includes a lens unit 22, a focusing-zooming-iris control unit 23, and a capturing unit 24 (indicated by "CCD"). The focusing-zooming-iris control unit 23 is controlled based on a control signal supplied from the controller CPU 33 through the controller bus 21. The capturing unit 24 includes a solid-state image sensing device, for example, a charge-coupled device, and a camera-signal processing circuit. A digital picture signal from the capturing unit 24 is written into a buffer memory 26 through an interface 25.

Output data from the buffer memory 26 is supplied to a JPEG-encoder/meta-data adder 27, and the picture data is converted into JPEG data. JPEG is one of compression methods. Another compression method may be used, or the picture data may not be compressed.

The camera unit 3 includes a global positioning system (GPS) 28 for detecting the position of the camera unit 3. Since the camera unit 3 includes the GPS 28, data of the installing location of the camera unit 3 can be recorded, and the direction of the camera unit 3 can be detected, thus enabling cooperative control of the directions of camera units. The GPS 28 is controlled based on a control signal supplied from the controller CPU 33 through the controller bus 21.

Output signal from the GPS 28 is supplied to a meta data generator 29. The meta data generator 29 generates positional information (information such as latitude, longitude, direction, and altitude) based on the result of positioning performed by the GPS 28, meta data (information such as time and parameters (such as magnification, a focusing value, and an iris value) of the camera unit 3), etc. The positional information and meta data are supplied to the JPEG-encoder/meta-data adder 27, and the supplied positional information and meta data are added to the JPEG data.

The JPEG data having the added positional information and meta data is stored in the main memory 30 such as a hard disk, and is supplied to the graphic controller 31 and the image compressor 32. In this Specification, to store data in the main memory 30 is called "to record data", and to read data from the main memory 30 is called "to play back data". Also, to display an image being presently captured without using the main memory 30 is called a "live mode", and to playback and display data recorded in the past is called a "view mode".

The main memory 30 has a server function. For example, in the case of using JPEG to compress an XGA image, the amount of data of one frame is 100 kilobytes. Thus, 128 images have a data amount of 12.8 megabytes. When the main memory 30 has a capacity of approximately 80 gigabytes, it can store JPEG data per day. In the view mode, not only data stored in the main memory 30, but also older data stored in a storage unit such as the archive 10 can be played back.

JPEG data read from the main memory 30 is supplied to a graphic controller 31. An image compressor 32 generates a compressed image or a thumbnail from JPEG data supplied from the JPEG-encoder/meta-data adder 27 or JPEG data read from the main memory 30. For example, by decimating vertical pixels and horizontal pixels, a panoramic entire image is formed. The image compressor 32 also performs compressing processing for forming a movable range image (described later). As described above, in the case of XGA, data having approximately one hundred million pixels is processed by JPEG compression and the image compressor 32 to form a panoramic image having a resolution of 400 by 1000 pixels. The movable range image is also a thumbnail, and is lower in resolution than the entire image.

The graphic controller 31 performs graphics processing that performs converting JPEG data into bitmap data and displaying a desired image on the screen of the display 2. Specifically, the display 2 displays, on the screen, the movable range image, the entire image, selectable images, and a GUI such as buttons. Details of the displayed images and the GUI are described later.

The graphic controller 31 detects a change in image by performing image processing. The change in image is a change occurring compared with a reference image. For example, in the view mode, by performing comparison with a previously stored reference image, a change in image is detected. As a reference image, an image at a predetermined time on the previous day is set, and between the reference image and an image stored after the reference image is stored, a difference in pixel level is detected. In a case in which the absolute value of the difference in pixel is equal to or greater than a predetermined value, the graphic controller 31 regards the case as occurrence of a change, and detects the change. Detection of a difference uses a method in which, for each frame in spatially identical position between a reference image and an image to be compared therewith, differences in pixel level are calculated. Instead of detecting differences concerning all the pixels, differences concerning typical pixels or decimated pixels may be calculated. Also, by using limitation to a predetermined color, a change, clarified when an attention is paid to an object in the predetermined color, can be detected.

After the change is detected, the display 2 displays an alarm screen on which, for example, a frame in which a change is detected can be distinguished from another frame. Specifically, an alarm representation can be displayed by a technique such as a brightness change, color change, or blinking. As the reference image, a predetermined image can be arbitrarily selected from among stored images.

As described above, the controller CPU 33 connected to the controller bus 21 controls the camera unit 3, such as lens control (e.g., focusing, etc.), exposure control (e.g., control of diaphragm, gain, electronic shutter speed, etc.), white balance control, and image quality control, and controls the pan portion 4a and the tilt portion 4b.

A keyboard (K/B) 35 and a mouse 36 are connected to an input/output (I/O) port 34. Also, a memory card 37 and a clock 38 are connected to the I/O port 34. Positional information and JPEG data to which meta data is added, which are stored in the main memory 30, can be written in the memory card 37. From the clock 38, time data is obtained.

In FIG. 2, components are connected to the controller bus 21. However, the camera unit 3 and the computer 1 may be installed in remote places and both may be connected to each other by using a connection such as IEEE1394 or USB (Universal Serial Bus). In this case, an optical fiber is used as a physical transmission line. By using an optical fiber, the camera unit 3 and the computer 1, which controls the camera unit 3, can be installed, with several hundred meters to several kilometers provided therebetween. In addition, both may be connected to each other by a wireless LAN.

Figure 3:
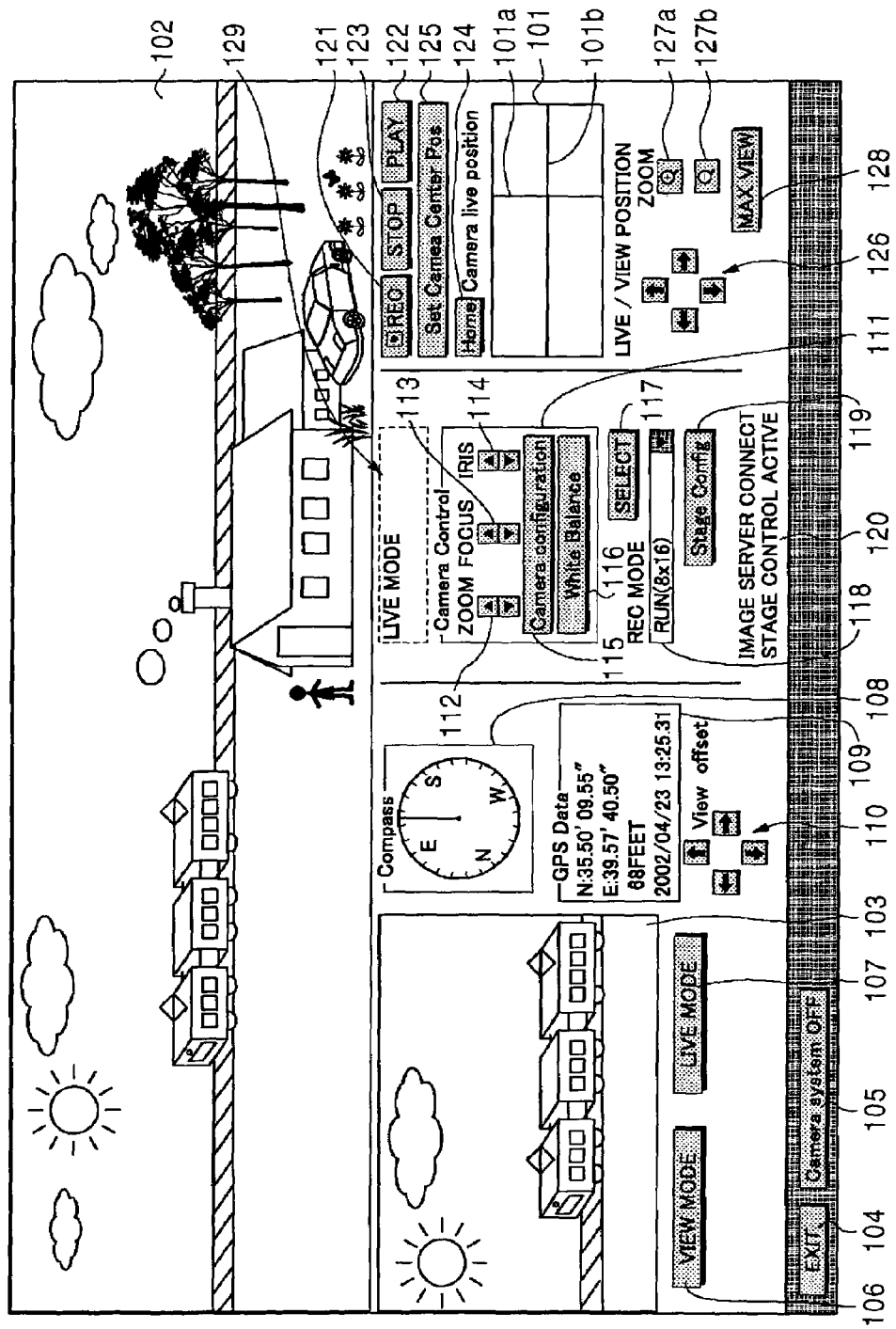
FIG. 3 is a schematic illustration of an example of a screen having a GUI in the embodiment of the present invention.

FIG. 3 shows an example of a GUI screen in this embodiment. A display section, operation buttons, a display field, etc., which are displayed on the GUI screen, are described below with reference to FIG. 3.

The GUI screen includes a movable-range-image display section 101, an entire-image display section 102, and a selected mage display section 103 In the movable-range-image display section 101, the movable range image is displayed. The movable range image is an image showing the maximum range in which the camera unit 3 can perform picture capturing, and consists of a plurality of frames. As described above, the maximum pan angle is 180 degrees and the maximum tilt angle is 50 degrees, and a plurality of frames which are captured in the maximum movable range based on the above two maximum angles are processed to generate a movable range image. For example, when the camera unit 3 is installed and starts picture capturing, the camera unit 3 is moved over the maximum movable range, and an image composed of a plurality of frames is obtained. A thumbnail, generated by decimating the vertical and horizontal pixels of the obtained image, is used as the movable range image.

In the movable-range-image display section 101, a position (hereinafter referred to as a "camera live position") to which the optical axis of the lens of the camera unit 3 is directed is indicated by an intersection point of a line segment 101a and a line segment 101b. By moving the line segments 101a and 101b, a desired position can be designated in the movable range image, and the direction of picture capturing can be controlled to move in the direction of the designated position. With the direction of the designated position used as a center or a home position, (M×N) frames (still images) are captured in a predetermined movable range, and are stored or displayed. Not only by designating the line segments 101a and 101b, and but also by using a pointer to designate an arbitrary position on the display screen displayed in the movable-range-image display section 101 so that the optical axis of the lens of the camera unit 3 is directed to a position corresponding to the designation, the camera unit 3 may be controlled.

In the entire-image display section 102, the panoramic entire image is displayed. The panoramic entire image is an image generated by using the image compressor 32 to compress JPEG data corresponding to the original image captured by the camera unit 3. By viewing the displayed entire image, monitoring can be performed. As described above, when the change in image is detected, an alarm screen appears in which, in the entire image displayed in the entire-image display section 102, a frame from which the change is detected is displayed differently from the other frames.

In the selected mage display section 103, a selected image is displayed. The selected image is an enlarged image of a portion of the entire image. By displaying one frame of the original image in uncompressed form, an enlarged image is obtained. In addition, digital signal processing is used to enlarge an image.

An EXIT button 104 is used to switch off the power supply of the monitoring system. A Camera system OFF button 105 is used to switch off the power supply of the camera unit 3.

A VIEW MODE button 106 is used to switch the mode of the monitoring system to the view mode. In the view mode, the entire image and a partial image are displayed based on image data stored in the main memory 30 or in another server.

A LIVE MODE button 107 is used to switch the mode of the monitoring system to a live mode. In the live mode, the entire image and a partial image are displayed based on a frame which is being presently captured by the camera unit 3.

A Compass display field 108 is used to display a compass indicating the direction in which the optical axis of the lens of the camera unit 3 is directed. A GPS Data field 109 is used to display the latitude, longitude, and altitude of the place at which the camera unit 3 is installed, and the date and time of picture capturing. Pieces of data displayed in the fields 108 and 109 are those measured by a global positioning system (GPS) provided in the camera unit 3.

View offset buttons 110A, 110B, 110C, and 110D are used to adjust the location of the selected frame. The View offset buttons 110A, 110B, 110C, and 110D are respectively used to move, in upward, downward, left, and right directions, a frame which is selected, in the entire image displayed in the entire-image display section 102, by the pointer. The frames constituting the entire image are connected to one another so that predetermined numbers of (e.g., 16) pixels of two adjacent frames overlap each other. By moving one frame in the overlapping portion, consistency with an adjacent frame can be established, thus smoothing the connection state.

A mode display field 129 is used to display mode information, alarm information, error information, etc. The mode information informs the user of the mode of the monitoring system, and is specifically information such as the live mode and the view mode. The alarm information warns the user, and is displayed, for example, when a movement of the frame by the View offset button 110 reaches a movable limit. The error information informs the user of an error occurring in the monitoring system.

A Camera Control section 111 includes a ZOOM button 112, a FOCUS button 113, an IRIS button 114, a Camera Configuration button 115, and a White Balance button 116. The ZOOM button 112 is used to adjust zooming of the camera unit 3. The FOCUS button 113 is used to adjust focusing of the camera unit 3. The IRIS button 114 is used to perform iris adjustment of the camera unit 3. The Camera Configuration button 115 is used to adjust the gamma characteristic, shutter speed, gain characteristic, etc., of the camera unit 3. The White Balance button 116 is used to adjust the white balance of the camera unit 3. When the camera unit 3 is in the view mode, the information displayed on the Camera Control section 111 may be omitted.

A SELECT button 117 is used to display a selection screen in the view mode. The selection screen is a picture in which a desired field for playback and recording is specified by using the frames constituting the entire image.

Figure 4:
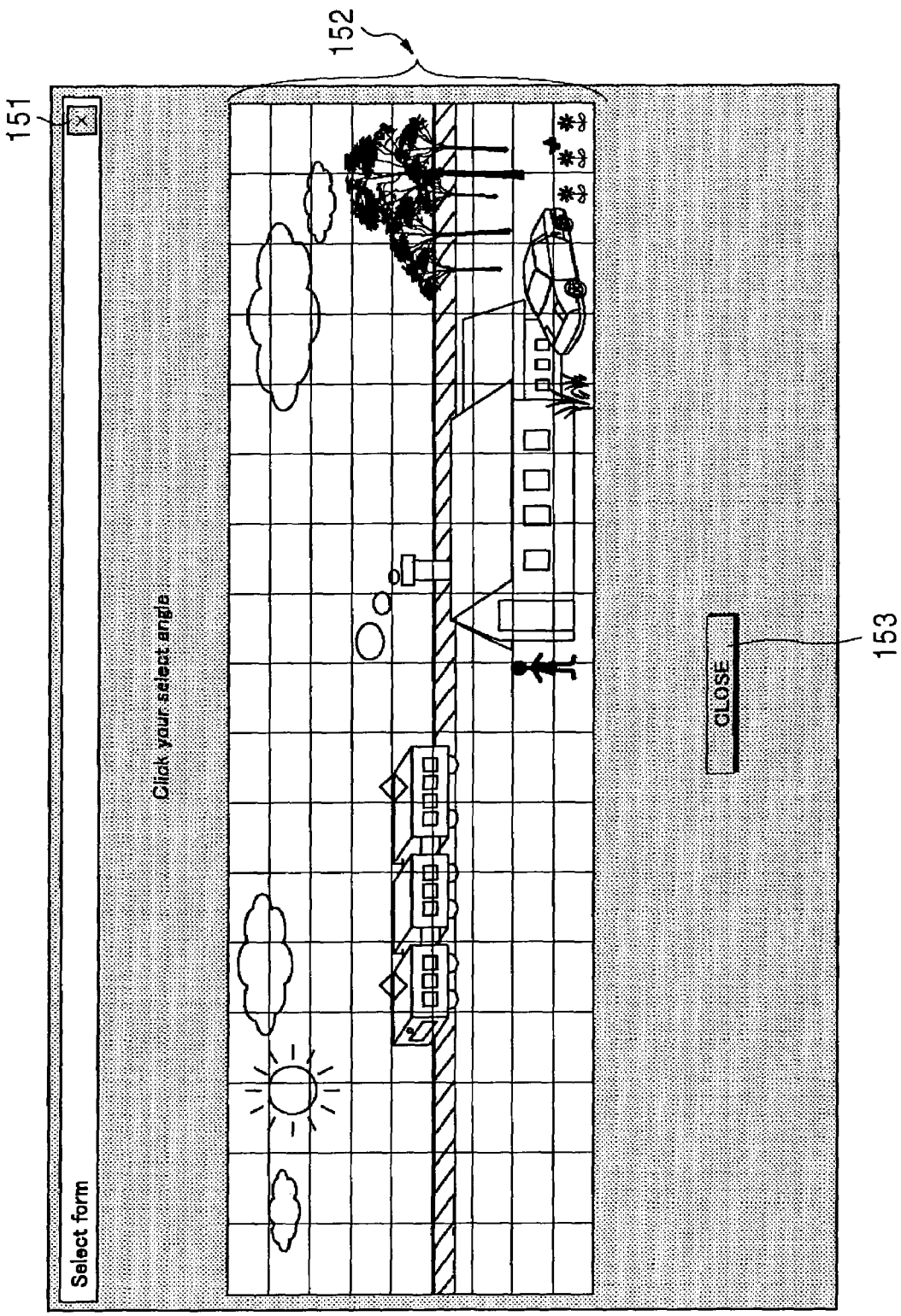
FIG. 4 is a schematic illustration of an example of a selection screen in the embodiment of the present invention.

FIG. 4 shows an example of the selection screen. On the selection screen, a grid indicating frame partitions is superimposed on the entire image. For example, by using the pointer to designate a frame in a desired position on the selection screen, the designated frame is selected, and the brightness, resolution, contrast, etc., of the designated frame are changed in order to indicate that the designated frame is selected.

A REC MODE selecting menu 118 is a pulldown menu for selecting a recording mode. The pulldown menu displays recording modes which are combinations of image sizes for recording and recording methods (RUN and SINGLE). As the image size, any one of an entire image composed of (8 by 16) frames, a partial image composed of (4 by 8) frames selected in the entire image, and a partial image composed of (2 by 4) frames selected in the entire image can be selected. Each partial image is selected in the position selected from the selection screen. In the recording method RUN, captured images generated at predetermined periods (e.g., 5-second periods) are recorded. In the recording method SINGLE, the captured images are recorded only once. A combination of both modes can be selected as a recording mode.

A Stage Configuration button 119 (indicated by "Stage Config") is used to fine-adjust stage-moving precision, etc. A message field 120 is used to display the connection status between the computer 1 for control and the camera unit 3 and the control status of a camera unit stage. When the computer 1 and the camera unit 3 are connected to each other, as FIG. 3 shows, the message "IMAGE SERVER CONNECT" is displayed in the message field 120. When the camera unit stage is in a controllable status, the message "STAGE CONTROL ACTIVE" is displayed in the message field 120.

A REC button 121 is used to initiate image recording. By pressing the REC button 121, recording in accordance with the selected recording mode. Specifically, recording in accordance with a mode selected from among the recording modes RUN (8×16), RUN (4×8), RUN (2×4), SELECT SINGLE RUN (8×16), SELECT SINGLE RUN (4×8), and SELECT SINGLE RUN (2×4) is initiated.

A PLAY button 122 is used to play back image data stored in a server (the main memory 30). Specifically, by pressing the PLAY button 122, a stored data display screen is displayed. The stored data display screen displays information for identifying the stored image data. The information is based on information described in a direction file.

Figure 5:
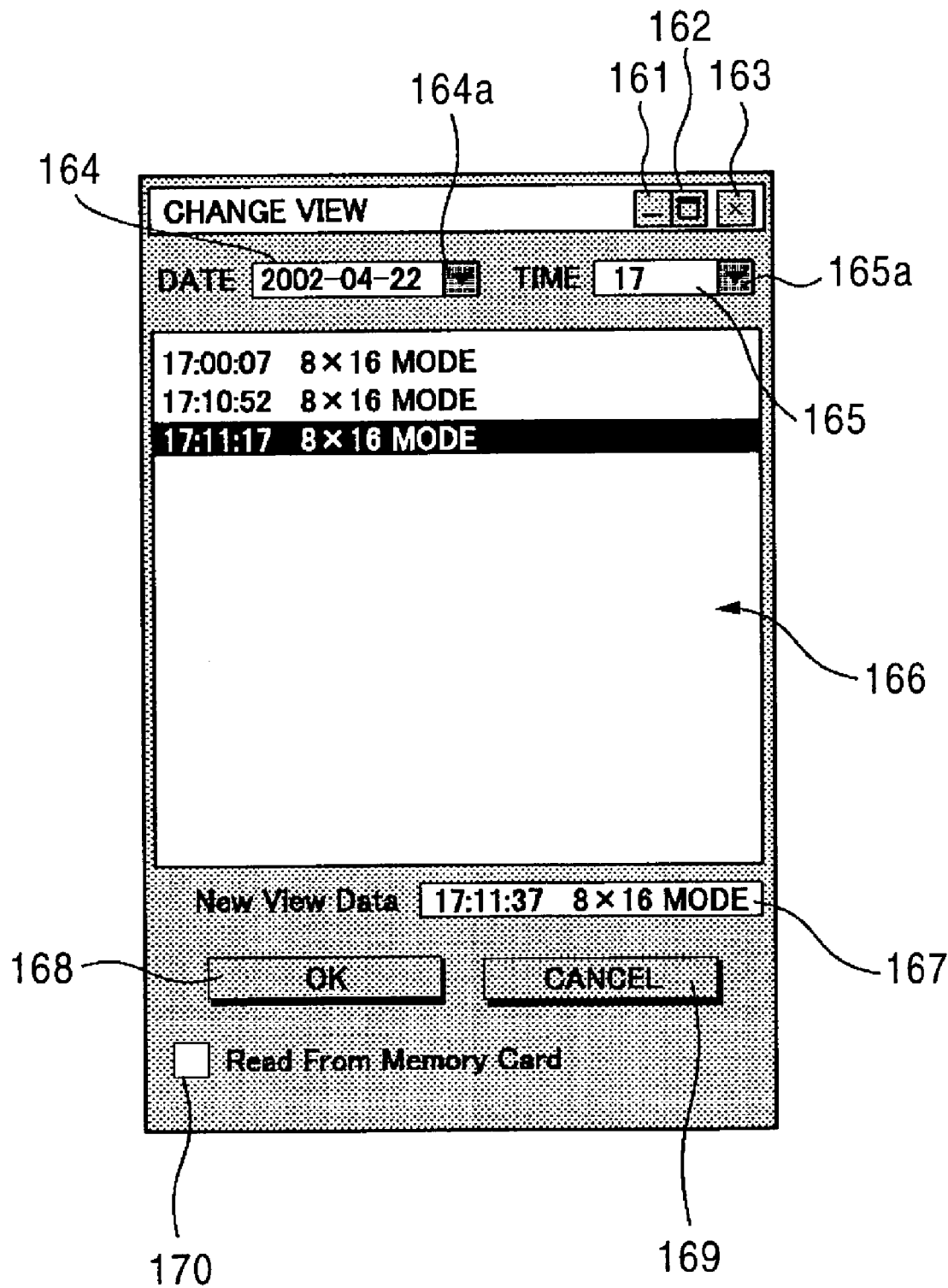
FIG. 5 is a schematic illustration of an example of a stored data display screen in the embodiment of the present invention.

FIG. 5 shows an example of the stored data display screen. As shown in FIG. 5, the stored data display screen displays a minimization button 161, a maximization button 162, a close button 163, a date designating field 164, a time designating field 165, an stored data display field 165, a latest stored data display field 167, and an OK button 168, a cancel button 169, and a storage-unit change check button 170.

The minimization button 161 is clicked on when the stored data display screen is minimized to, for example, an icon. The maximization button 162 is clicked on when the stored data display screen is maximized for using the entire display area of the display screen. The close button 163 is clicked on when the stored data display screen is closed.

In the date designating field 164, the date of stored data to be displayed in the entire-image display section 102 is designated. For example, by clicking on a button 164a at the right end of the date designating field 164, the dates of stored data which can be displayed are displayed in a pulldown-menu form. From the displayed dates, a desired date may be selected.

In the time designating field 165, the time of a stored data item to be displayed in the entire-image display section 102 is designated. For example, by clicking on a button 165a at the right end of the time designating field 165, displayable times of stored data items are displayed in the form of a pulldown menu. From the displayed times, a desired time may be selected.

In the stored data display field 165, among the stored data items, an stored data item having the date and time designated by the date designating field 164 and the time designating field 165 is displayed. In the latest stored data display field 167, among the stored data items, the latest data item is displayed. Alternatively, among stored data items having dates and times designated by the date designating field 164 and the time designating field 165, the latest stored data item may be displayed.

The OK button 168 is clicked on when a desired stored data item is designated. The cancel button 169 is clicked on when the stored data display screen is closed. In the storage-unit change check button 170, a check mark is input when the source of the stored data is changed from the storage unit of the server to, for example, a removably loaded semiconductor memory (memory card).

Referring back to FIG. 3, a STOP button 123 is used to stop a recording or playback operation. The STOP button 123 may be displayed by pressing the REC button 121 or the PLAY button 122.

A Set Camera Center Position (Set Camera Center POS) button 125 is used to designate the direction in which the camera unit 3 is presently directed, as the center of an image of 8 by 16 frames.

A HOME button 124 is used to direct the optical axis of the camera unit 3 to a home position by controlling the camera unit 3. The home position is a position in which the camera unit 3 is directed to the leftest. LIVE/VIEW POSITION buttons 126 are used to move the camera unit 3 to pan or tilt.

ZOOM buttons 127A and 127B are respectively used to enlarge and reduce the size of the selected image displayed in the selected mage display section 103. A MAX VIEW button 128 is used to display the selected image on a separate screen, for example, the entire-image display section 102.

Next, an example of a method for creating the entire image according to an embodiment of the present invention is described below with reference to FIG. 6.

Figure 6:
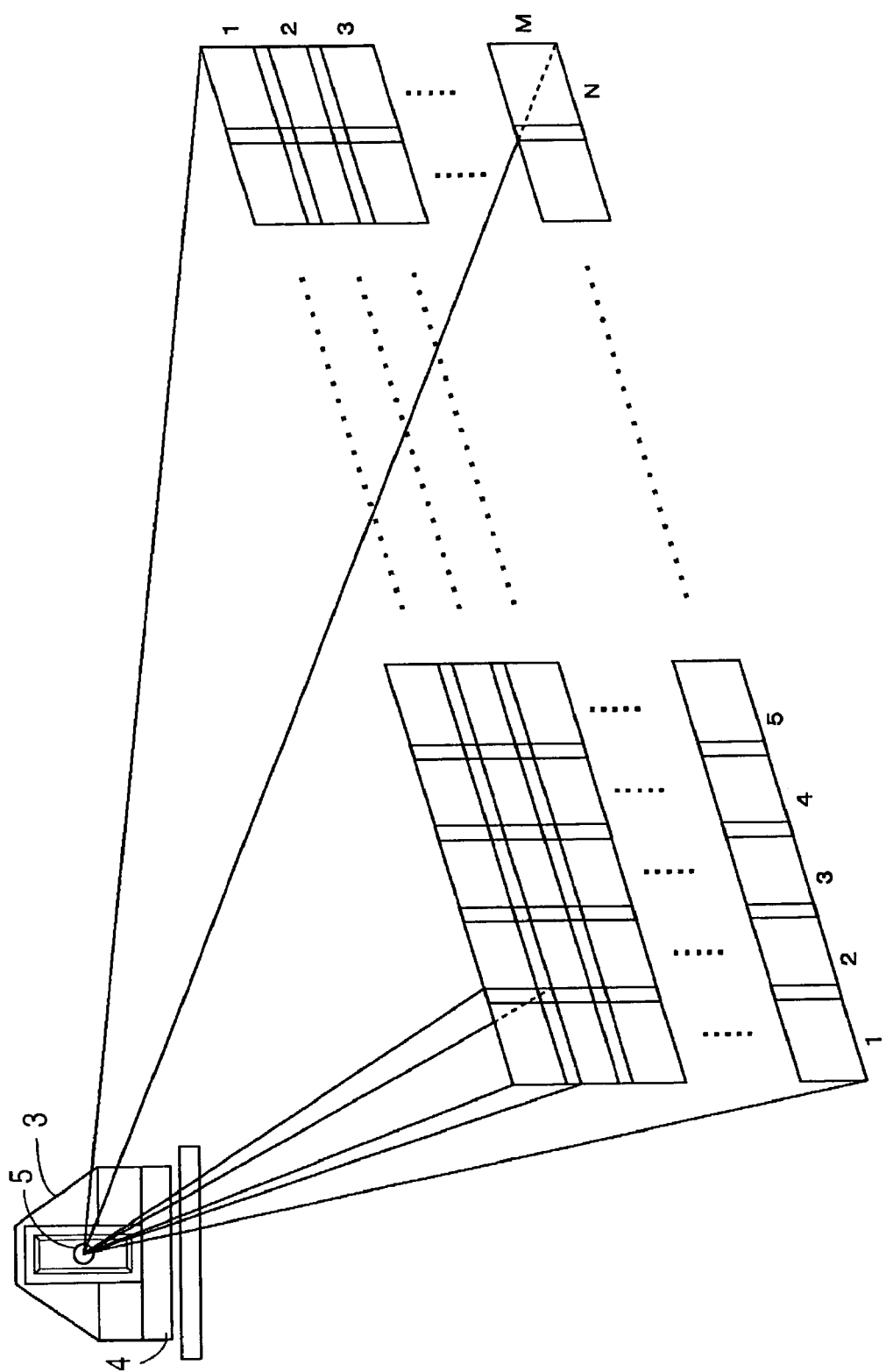
FIG. 6 is a perspective schematic illustration of a method for creating an entire image in the embodiment of the present invention.

As shown in FIG. 6, the camera unit 3 is formed such that the camera section 5 is mounted on the camera platform of the pan-tilter section 4 so that the picture capturing direction from the home position can be changed. In FIG. 6, when being viewed from the camera unit 3, the rows of (M by N) captured frames are sequentially numbered 1, 2, ..., M from top, and the columns of the (M by N) captured frames are sequentially numbered 1, 2, ..., N from left. For example, a position in which the frame having coordinates (1, 1) is captured is used as the home position.

After the frame having coordinates (1, 1) is captured, the camera unit 3 is moved to tilt downward, and the frame having coordinates (2, 1) is captured. Subsequently, the frames having pairs of coordinates (3, 1), ..., (M, 1) are sequentially captured. Next, the frame which is positioned at the top in the second column and which has coordinates (1, 2) is captured. The subsequent frames up to the frame having coordinates (M, N) are captured. As described above, each frame has a 16-pixel portion overlapping another frame. The captured frames are processed, such as JPEG compression and storage to the main memory 30.

As described above, in a case in which each frame has an XGA form (1024 by 768 pixels), an image composed of 128 frames has approximately one hundred million pixels (having (1024×16=) 16384 horizontal pixels by (768×8=) 6144 vertical pixels) when overlapping portions are ignored. In the entire-image display section 102, a compressed image or thumbnail formed from the above image is displayed, and in the selected mage display section 103, an XGA image of, for example, one frame is displayed. Therefore, in the selected mage display section 103, an image having a very high resolution can be displayed. Thus, also an unclear image as an entire image can be displayed as a clear image.

Figure 7:
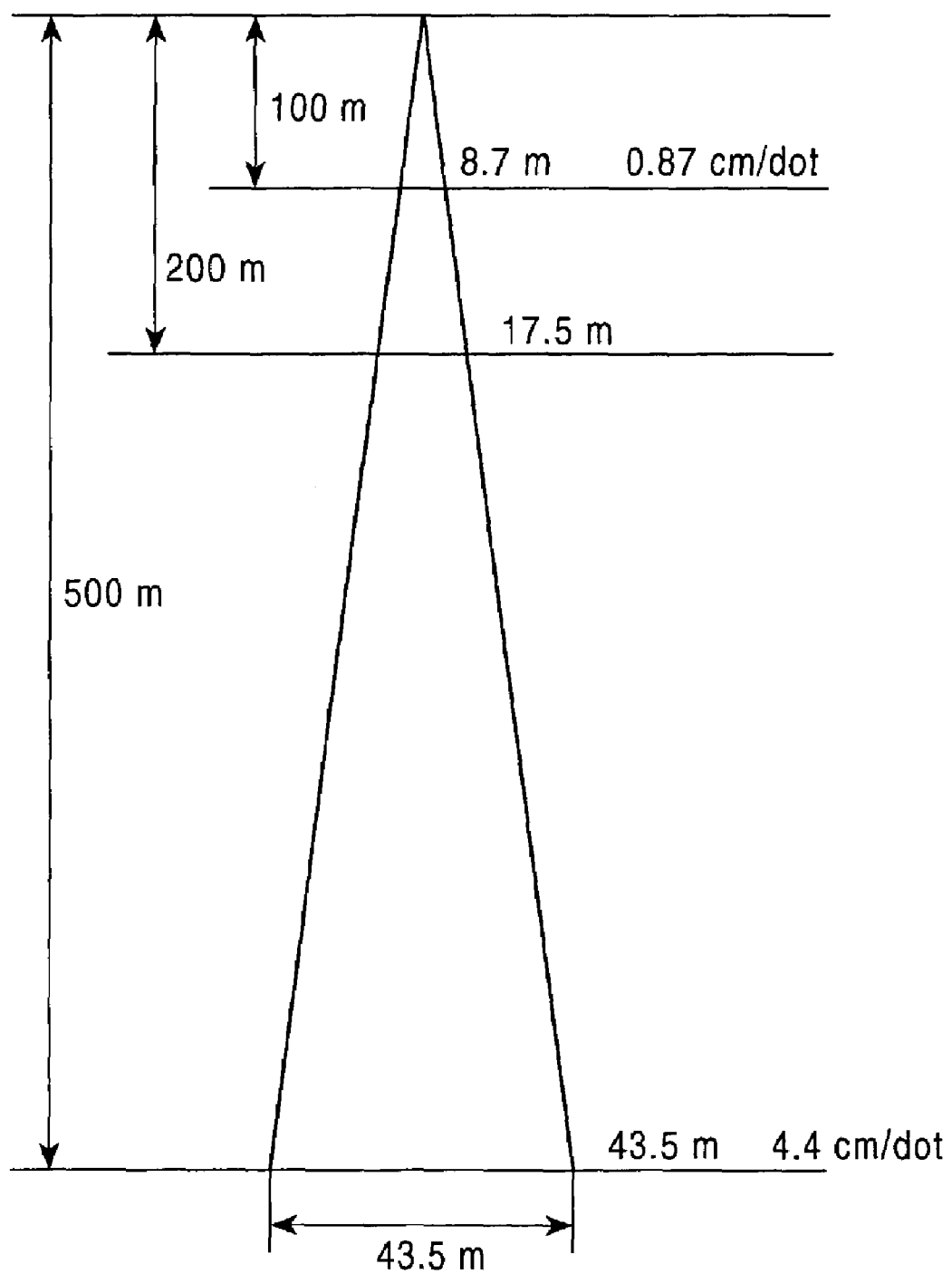
FIG. 7 is a schematic illustration of a range in which picture capturing can be performed in the monitoring system shown in FIG. 1.

FIG. 7 shows a range in which picture capturing can be performed by using one frame when the camera unit 3 is provided with a telephoto lens of 75 magnifications. When a picture of a subject positioned 100 meters away from the camera unit 3 is captured, one frame is used to enable capturing a picture of a range of 8.7 by 1.17 meters. For example, when XGA is used for the picture capturing device of the camera section 5, a range of 0.87 by 1.17 centimeters of the subject can be represented by approximately one pixel.

When a picture of a subject positioned 200 meters away from the camera unit 3 is captured, one frame is used to enable capturing a picture of a range of 1.17 by 2.34 meters. For example, when XGA is used for the picture capturing device of the camera section 5, a range of 1.74 by 2.34 centimeters of the subject can be represented by one pixel.

When a picture of a subject positioned 500 meters away from the camera unit 3 is captured, one frame is used to enable capturing a picture of a range of 4.36 by 5.84 meters. For example, when XGA is used for the picture capturing device of the camera section 5, a range of 4.36 by 5.84 centimeters of the subject can be represented by one pixel.

Figure 8A:
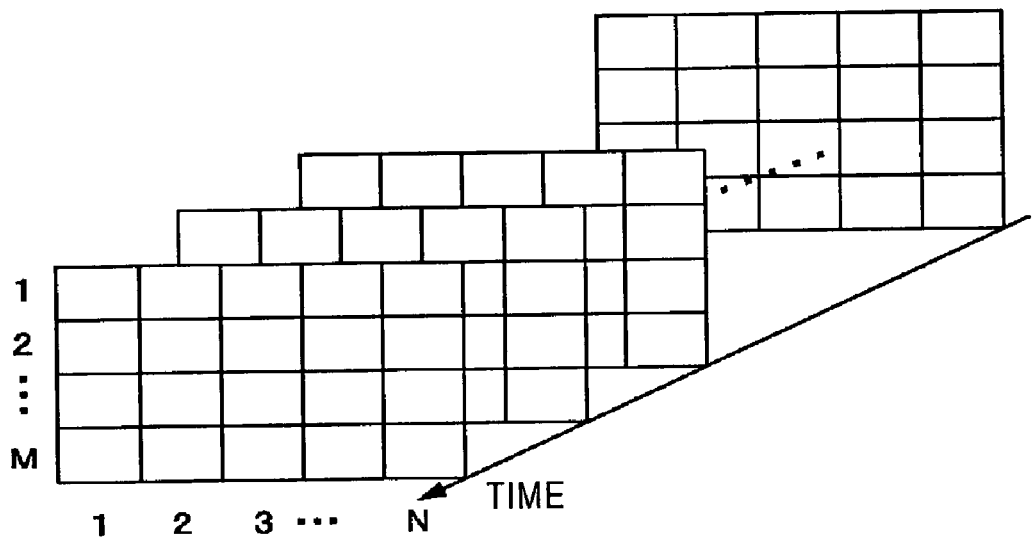
FIGS. 8A and 8B are schematic illustrations of a data management method in the embodiment of the present invention.

A data management method in the case of storing the acquired data in the archive 10, the main memory 30, etc., is described below with reference to FIGS. 8A and 8B.

As described above, images of M by N frames are captured at predetermined time intervals, and are stored in compressed form. As FIG. 8A shows, M rows and N columns are used to determine the positions of the frames. For example, the positional address (1, 1) specifies the frame at the top of the right end. Each frame has a set of such a positional address and recording-mode time information as a file name. The time information consists of a date (year, month, day) and a time (hours, minutes, seconds). Accordingly, the file name of the frame has a "year-month-day-hours-minutes-seconds-and-positional-address form.

Figure 8B:
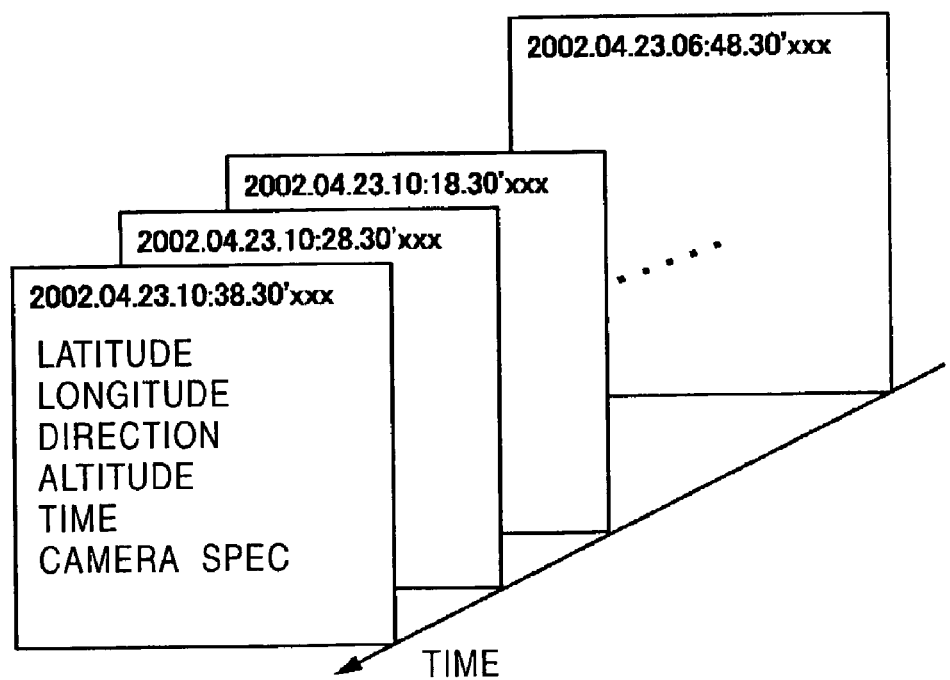
Figure 11:
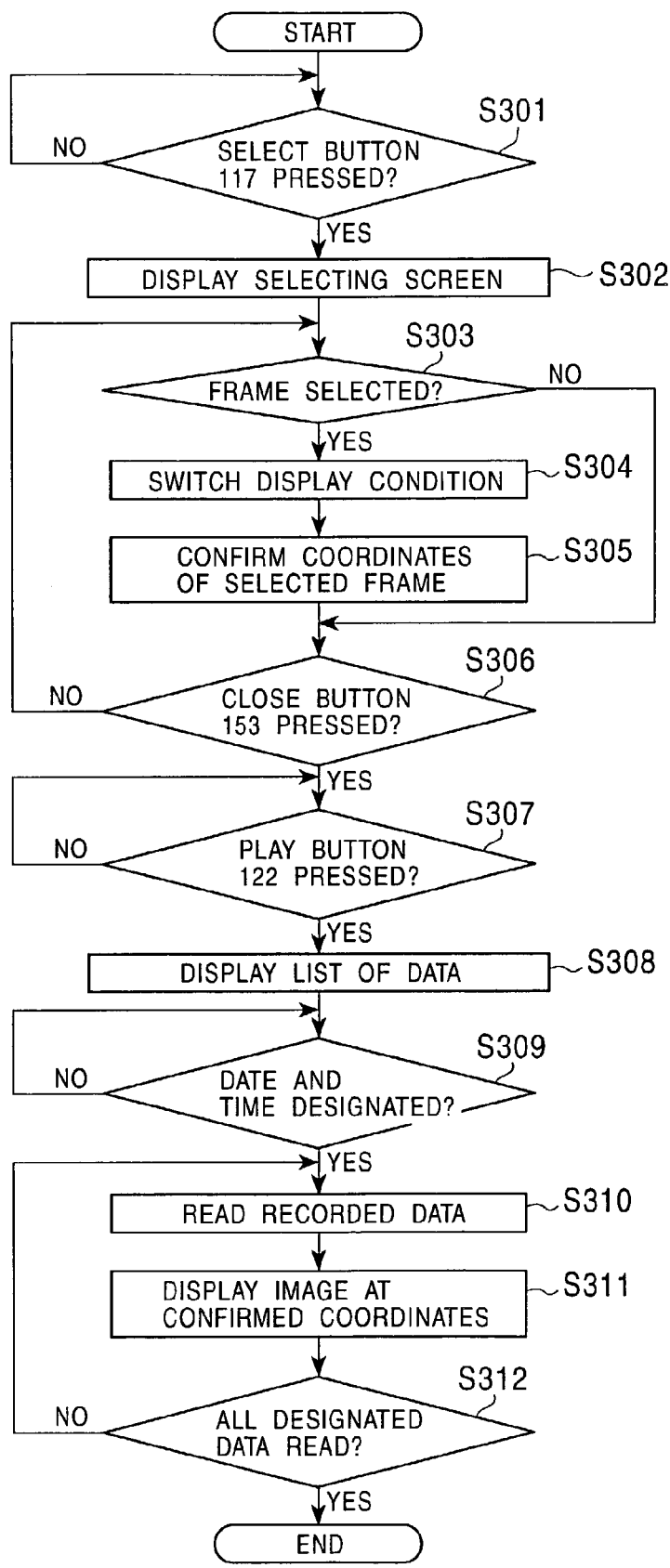
FIG. 11 is a flowchart illustrating a process of the monitoring system when it is in a multipoint view mode, according to one embodiment of the present invention.

As FIG. 8B shows, a direction file is determined corresponding to the formation of an entire image from M by N frames. In the direction file, by having data identical to the file name (i.e., a date and time and a positional address) of a frame having the positional address (1, 1), a set of the M by N frames is defined. The direction file also has positional information and meta data corresponding to the set of the frames. The positional information and the meta data are generated by the meta data generator 29. In other words, the direction file has positional information such as latitude, longitude, direction, and altitude, and meta data information such as the parameters (such as magnification, a focusing value, and an iris value) of the camera unit 3.

FIG. 9 is a flowchart illustrating an operation of the entire-image display section 102 which captures frames of an entire image in an embodiment of the present invention.

When the LIVE MODE button 107 is designated by the pointer, and the REC button 121 is designated by the pointer, the control algorithm of the flowchart is called.

In step S101, when, in the movable range image displayed in the movable-range-image display section 101, a capturing position is designated, it is determined in which point of the movable range image the entire image corresponds to, and coordinates for capturing the entire image are confirmed.

In step S102, a starting position for capturing the entire image is calculated. Based on the result of the calculation, the pan portion 4a and the tilt portion 4b of the camera unit 3 are controlled to move the optical axis of the lens of the camera unit 3 to the starting position of the capturing. Here, the starting position of the capturing is the position of the center of a first frame which is captured.

In step S103, by controlling the camera unit 3, specifically, the lens unit 22, the focusing-zooming-iris control unit 23, the capturing unit 24, etc., the frame is captured and is supplied as image data to the computer 1.

In step S104, the image data supplied from the camera unit 3 is converted into a predetermined image format, for example, JPEG.

In step S105, meta data and positional information are added to the converted image data in the predetermined image format.

In step S106, the image data having the added meta data and positional information is recorded in the main memory 30.

In step S107, the converted image data in the predetermined image format is displayed at a designated address in the entire-image display section 102, for example, the address (0, 0).

In step S108, a moving distance of the optical axis of the camera unit 3 to the next frame is calculated.

In step S109, based on the moving distance calculated in step S108, the pan portion 4a and the tilt portion 4b are controlled to direct the optical axis of the lens of the camera unit 3 to the center of the next frame.

In step S110, the number of captured frames is calculated. For example, with the number of captured frames incremented whenever a frame is captured, the incremented number may be counted.

In step S111, it is determined whether or not the calculated number of the captured frames has reached a designated number of frames. If it is determined that the calculated number of the captured frames has reached the designated number, control is transferred to step S112. If it is determined that the calculated number of the captured frames has not reached the designated number yet, control is returned to step S103. The designated number of frames is calculated beforehand in response to the mode selected in the REC MODE selecting menu 118. Specifically, when the mode RUN (8×16) is selected, the number of frames is 128. When the mode RUN (4×8) is selected, the number of frames is 32. When the mode RUN (2×4) is selected, the number of frames is 8.

In step S112, the distance from the present position corresponding to the optical axis of the lens of the camera unit 3 to the starting portion for capturing in the entire-image display section 102 is calculated.

In step S113, based on the distance calculated in step S112, the pan portion 4a an the tilt portion 4b are controlled to direct the optical axis of the lens of the camera unit 3 to the center of the frame which is used as the starting position for capturing.

In step S114, it is determined whether or not the number of times the entire-image display section 102 is updated has reached a pre-designated number of times the entire-image display section 102 is updated. Specifically, it is determined which of the selection mode and the run mode in the REC MODE selecting menu 118 is selected. Accordingly, if it is determined that, in the REC MODE selecting menu 118, the selection mode is selected, control is transferred to step S115. If it is determined that, in the REC MODE selecting menu 118, the run mode is selected, control is transferred to step S117.

In other words, when, in the REC MODE selecting menu 118, the selection mode is selected, the number of times the entire-image display section 102 is updated is set to "1". Accordingly, all the frames displayed in the entire-image display section 102 are captured once, recorded, and displayed. Thus, processing for re-capturing, recording, and displaying is not performed. Conversely, when, in the REC MODE selecting menu 118, the run mode is selected, the number of times the entire-image display section 102 is updated is set to "infinite". Accordingly, processing for capturing, recording, and displaying is repeatedly performed until capturing is terminated, that is, the STOP button 123 is pressed.

In step S115, the distance from the starting position for capturing in the entire-image display section 102 to the central portion of the entire-image display section 102 is calculated. Based on the result of the calculation, the pan portion 4a and the tilt portion 4b of the camera unit 3 are controlled to move the optical axis of the lens of the camera unit 3 to the central portion of the entire-image display section 102. The central portion of the entire-image display section 102 is, for example, the central position of 8 by 16 frames.

In step S116, the operations of, for example, stepping motors of the pan portion 4a and the tilt portion 4b are stopped. Then, the control algorithm of the flowchart ends.

Also, in step S117, it is determined whether or not the end of capturing is commanded. Specifically, it is determined whether or not the STOP button 123 is designated by the pointer. If it is determined that the STOP button 123 is designated by the pointer, control is transferred to step S115. If it is determined that the STOP button 123 is not designated by the pointer yet, control is returned to step S103.

FIG. 10 is a flowchart illustrating an operation for playing back stored image data in an embodiment of the present invention. By clicking on the PLAY button 122, the control algorithm of the flowchart is started.

In step S201, when the PLAY button 122 is clicked on, the stored data display screen shown in FIG. 9 is displayed in the form of a popup window.

In step S202, it is determined whether or not a date is designated in the date designating field 164, and a time is designated in the time designating field 165. If it is determined that the date is designated in the date designating field 164, and the time is designated in the time designating field 165, control is transferred to step S203. If it is determined that both or either of the date in the date designating field 164 and the time in the time designating field 165 is not designated yet, the control in step S202 is repeatedly performed until a date is designated in the date designating field 164 and a time is designated in the time designating field 165.

In step S203, a movable range image and/or an entire image is displayed from stored data having the designated date and time.

Figure 12:
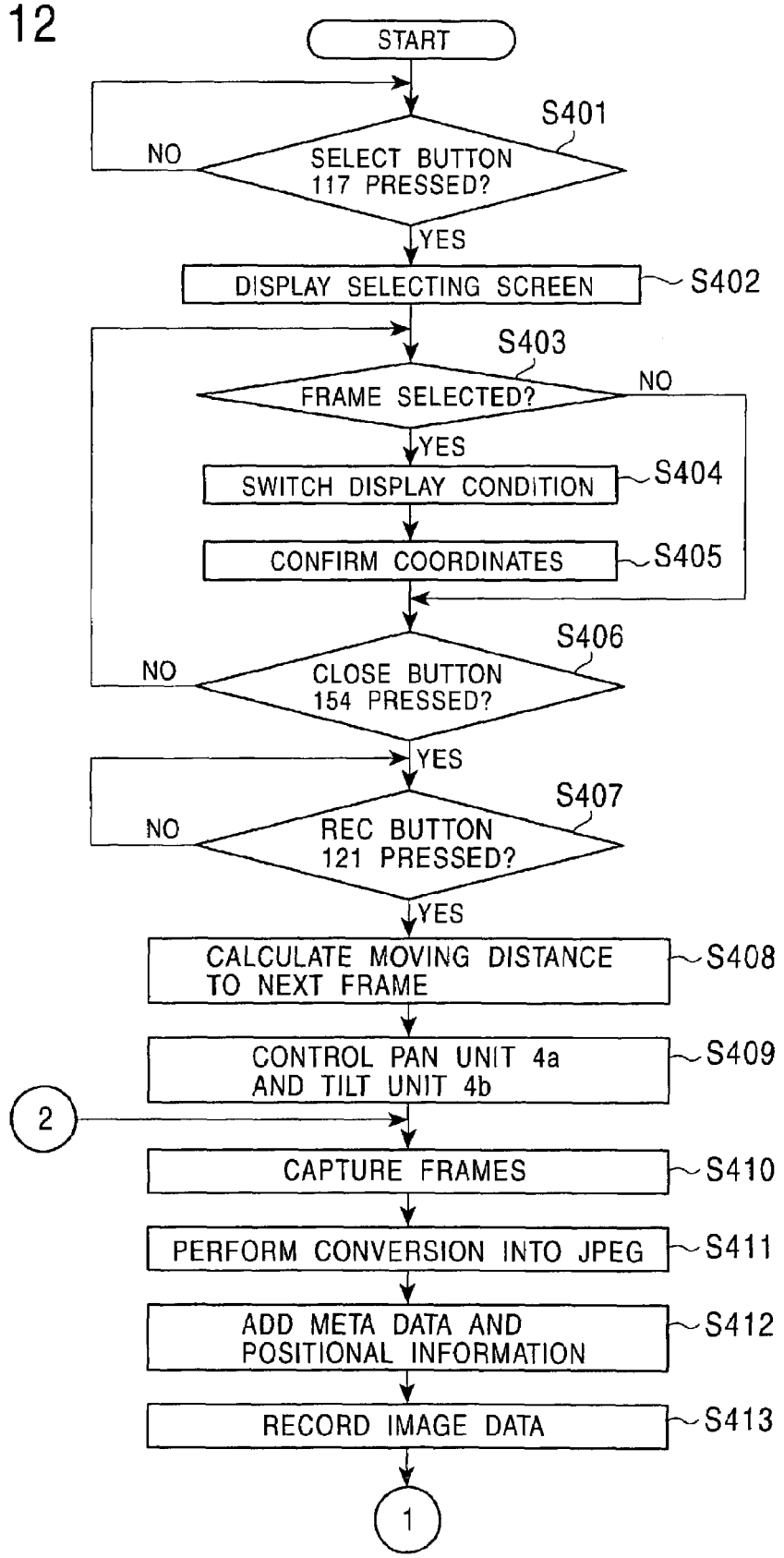
FIG. 12 is a flowchart illustrating a process of the monitoring system when it is in a multipoint drive mode, according to one embodiment of the present invention.

FIG. 12 is a flowchart illustrating a process of the monitoring system when it is in a multipoint view mode in an embodiment of the present invention. In the multipoint view mode, only an image in a designated position in the entire image is played back, tracing time back.

In step S301, it is determined whether or not the SELECT button 117 is pressed. If it is determined that the SELECT button 117 is pressed, control is transferred to step S302. If it is determined that the SELECT button 117 is not pressed, step 301 is repeatedly performed.

In step S302, a selection screen as described with reference to FIG. 4 is displayed. In step S303, it is determined whether or not a frame in the selection screen is selected by the pointer. If it is determined that the selection screen is selected, the process proceeds to step S304. If it is determined that no frame in the selectiond screen is not selected by the pointer, the process proceeds to step S306.

In step S304, display condition of the selected frame is switched. For example, the brightness of the selected frame is switched.

In step S305, the coordinates of the selected frame are confirmed.

In step S306, it is determined whether or not a CLOSE button 153 on the selection screen is pressed. If it is determined that the CLOSE button 153 is pressed, the process proceeds to step S307. If it is determined that the CLOSE button 153 is not pressed, the process returns to step S303.

In step S307, it is determined whether or not a PLAY button 122 is pressed. If it is determined that the PLAY button 122 is pressed, the process proceeds to step S308. If it is determined that the PLAY button 122 is not pressed, the process proceeds to step S307.

In step S308, a stored data display screen as described using FIG. 5 is displayed. In step S309, it is determined whether or not the OK button 168 is pressed on the stored data display screen after a desired range of dates and time for playback is designated. If it is determined that the OK button 168 is pressed after the desired range of dates and time is designated, the process proceeds to step S310. If it is determined that the OK button 168 is not pressed after the desired range of dates and time is designated, the process proceeds to step S309.

In step S310, among image data items in the range of dates and time designated in step S309, image data items corresponding to the coordinates confirmed in step S305 are read from the main memory 30. For example, among the image data items in the range of dates and time designated in step S309, image data items corresponding to the coordinates confirmed in step S305 are read from the main memory 30 in the order of newer dates and time of picture capturing.

In step S311, in the position of the coordinates confirmed in step S305, images based on the image data items read in step S310 are displayed.

In step S312, it is determined whether or not all the image data items designated on the stored data display screen have been read. If it is determined that all the image data items designated on the stored data display screen have not been read, the process proceeds to step S310. If it is determined that all the image data items designated on the stored data display screen have been read, the process ends.

The images in the frames other than the image in the frame designated by the pointer are images having newer dates and time of picture capturing than the date and time of the image to be updated in the designated frame, for example, images that are being captured by the camera unit 3. In this case, only the image in the frame designated by the pointer is updated, for example, tracing time back.

Also, the images in the frames other than the image in the frame designated by the pointer may have older dates and time of picture capturing than the date and time of the image in the designated frame. In this case, the image in the frame designated by the pointer is updated, for example, going from the past to the present.

According to an embodiment of the present invention, the following advantages can be obtained.

M by N frames captured by the camera unit 3 are compressed and stored in the main memory 30. An entire image composed the M by N frames stored in the main memory 30 is displayed on the display 2. Image data corresponding to a frame designated in the displayed entire image by the pointer is read from the main memory 30 and is displayed in the designated frame. Accordingly, in the entire image, only a particular frame can be updated. Thus, the time required for reading the image data stored in the main memory 30 can be reduced. This enables an improvement in the operability of image analysis in the monitoring system.

Also, an image corresponding to the coordinates of a frame designated in the entire image by the pointer can be read from the main memory 30 and can be played back.

Therefore, the frame designated in the entire image by the pointer can be played back, tracing time back.

In addition, by viewing the movable range image, which indicates a range in which the camera unit 3 can perform picture capturing, the user can easily know in what range the location of the camera unit 3 can capture pictures.

The embodiment of the present invention has been specifically described. However, the present invention is not limited to the embodiment, and can be variously modified based on the technical idea of the present invention.

The above values described in the embodiment are simply examples. Different values may be used, if necessary.

Although the embodiment describes a configuration in which the monitoring system includes the JPEG-encoder/meta-data adder 27, the JPEG-encoder/meta-data adder 27 may be omitted. In other words, by using M by N uncompressed original images, a panoramic entire image may be displayed on the display 2.

Although the embodiment describes a case in which an image in a frame designated by the pointer is updated (played back) from a newer date and time of picture capturing, the image in the frame designated by the pointer may be updated (played back) from an older date and time of picture capturing.

In the embodiment, the mode of the monitoring system may be switched to the multipoint view mode by the following operation.

At first, a VIEW MODE button 106 is pressed by the pointer. Next, by using the pointer to press a SELECT button 117, a selection screen as described using FIG. 4 is displayed. By designating a frame with the pointer on the selection screen, a desired region for view is selected.

Next, by pressing the PLAY button 122 with the pointer, a stored data display screen is displayed. A range of dates and time for playback are designated by using the pointer. Finally, the OK button 168 is pressed. This switches the mode of the monitoring system to the multipoint view mode.

Figure 13:
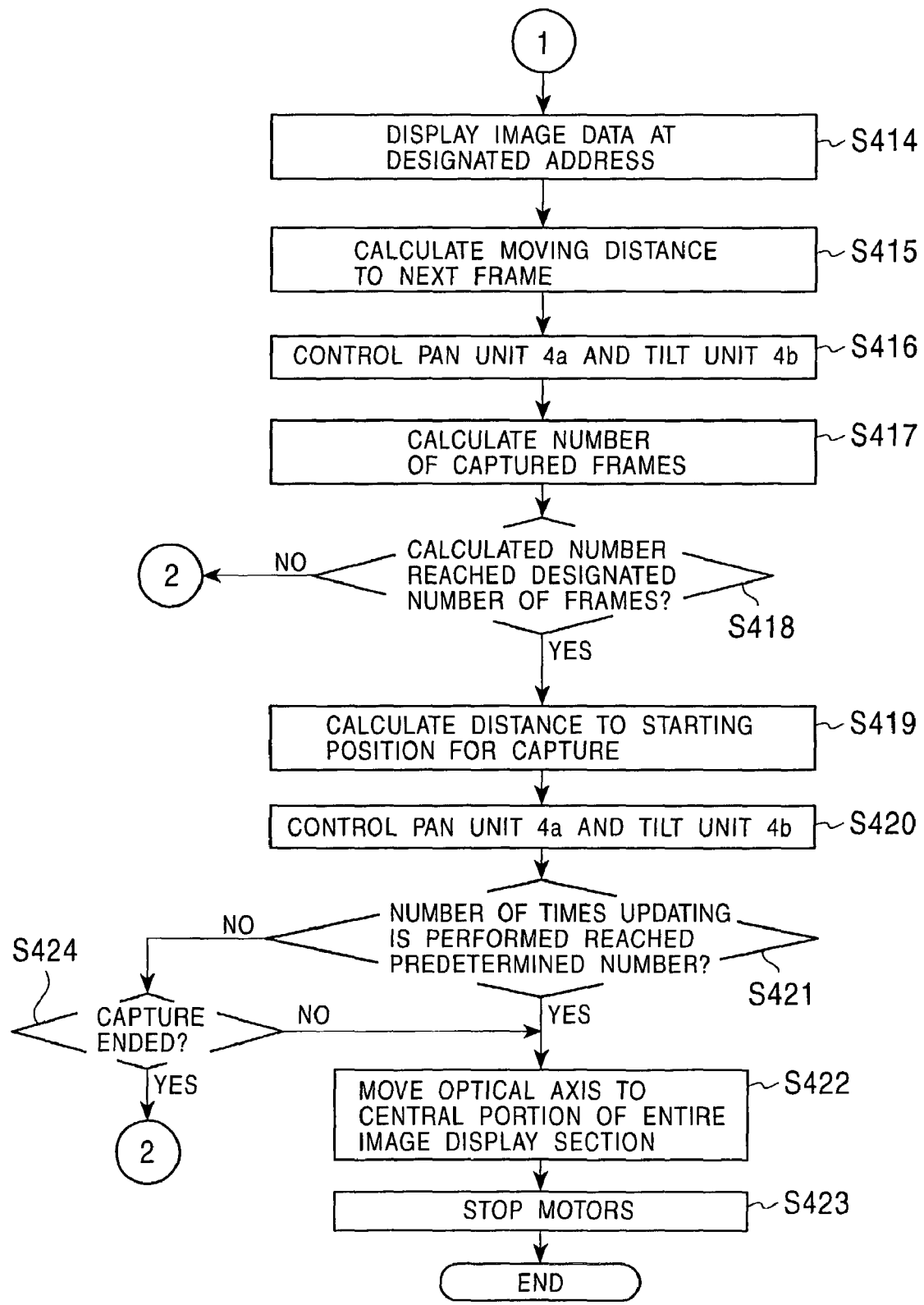
FIG. 13 is a flowchart illustrating the process shown in FIG. 12 of the monitoring system when it is in the multipoint drive mode.

FIGS. 12 and 13 are flowcharts illustrating a process of the monitoring system in the embodiment when the monitoring system is in a multipoint drive mode. In the multipoint drive mode, only an image in a position designated in the entire image is updated.

In step S401, it is determined whether or not the SELECT button 117 is pressed. If it is determined that the SELECT button 117 is pressed, the process proceeds to step S402. If it is determined that the SELECT button 117 is not pressed, step S401 is performed again.

In step S402, a selection screen as described with reference to FIG. 4 is displayed. In step S403, it is determined whether or not a frame in the selection screen is selected by the pointer. If it is determined that the frame in the selection screen is selected by the pointer, the process proceeds to step S404. If it is determined that the frame in the selection screen is not selected by the pointer, the process proceeds to step S406.

In step S404, display condition of the selected frame is switched. For example, the brightness of the selected frame is switched.

In step S405, the coordinates of the selected frame are confirmed.

In step S406, it is determined whether or not the CLOSE button 153 is pressed. If it is determined that the CLOSE button 153 is pressed, the process proceeds to step S407. If it is determined that the CLOSE button 153 is not pressed, the process returns to step S403.

In step S407, it is determined whether or not the REC button 121 is pressed. If it is determined that the REC button 121 is pressed, he process proceeds to step S408. If it is determined that the REC button 121 is not pressed, step S407 is repeated again.

In step S408, the moving distance of the optical axis of the lens of the camera unit 3 to a frame from which capturing is initiated is calculated.

In step S409, based on the moving distance calculated in step S408, the pan portion 4a and the tilt portion 4b are controlled to direct the optical axis of the lens of the camera unit 3 to the center of the next frame.

In step S410, by controlling the camera unit 3, specifically, the lens unit 22, the focusing-zooming-iris control unit 23, the capturing unit 24, etc., frames are captured and supplied as image data to the computer 1.

In step S411, image data supplied from the camera unit 3 is converted into a predetermined image format, for example, JPEG.

In step S412, meta data and positional information are added to the image data in the predetermined image format.

In step S413, the image data having the added meta data and positional information is recorded in the main memory 30.

In step S414, the image data in the predetermined image format is displayed at a designated address in the entire-image display section 102.

In step S415, the moving distance of the optical axis of the lens of the camera unit 3 to the next frame is calculated.

In step S416, based on the moving distance calculated in step S415, the pan portion 4a and the tilt portion 4b are controlled to direct the optical axis of the lens of the camera unit 3 to the center of the next frame.

In step S417, the number of captured frames is calculated. For example, with the number of captured frames incremented whenever a frame is captured, the incremented number may be counted.

In step S418, it is determined whether or not the number of captured frames has reached a designated number of frames. If it is determined that the number of captured frames has reached the designated number of frames, the process proceeds to step S419. If it is determined that the number of captured frames has not reached the designated number of frames yet, the process proceeds to step S410.

In step S419, the distance from the present position corresponding to the optical axis of the lens of the camera unit 3 to the starting portion for capturing in the entire-image display section 102 is calculated.

In step S420, based on the distance calculated in step S419, the pan portion 4a an the tilt portion 4b are controlled to direct the optical axis of the lens of the camera unit 3 to the center of the frame which is used as the starting position for capturing.

In step S421, it is determined whether or not the number of times the entire-image display section 102 is updated has reached a pre-designated number of times the entire-image display section 102 is updated. Specifically, it is determined which of the selection mode and the run mode in the REC MODE selecting menu 118 is selected. Accordingly, if it is determined that, in the REC MODE selecting menu 118, the selection mode is selected, the process proceeds to step S422. If it is determined that, in the REC MODE selecting menu 118, the run mode is selected, the process proceeds to step S424.

In other words, when, in the REC MODE selecting menu 118, the selection mode is selected, the number of times the entire-image display section 102 is updated is set to "1". Accordingly, all the frames displayed in the entire-image display section 102 are captured once, recorded, and displayed. Thus, processing for re-capturing, recording, and displaying is not performed. Conversely, when, in the REC MODE selecting menu 118, the run mode is selected, the number of times the entire-image display section 102 is updated is set to "infinite". Accordingly, processing for capturing, recording, and displaying is repeatedly performed until capturing is terminated, that is, the STOP button 123 is pressed.

In step S422, the distance from the starting position for capturing in the entire-image display section 102 to the central portion of the entire-image display section 102 is calculated. Based on the result of the calculation, the pan portion 4a and the tilt portion 4b of the camera unit 3 are controlled to move the optical axis of the lens of the camera unit 3 to the central portion of the entire-image display section 102. The central portion of the entire-image display section 102 is, for example, the central position of 8 by 16 frames.

In step S423, the operations of, for example, the stepping motors of the pan portion 4a and the tilt portion 4b are stopped. Then, the control algorithm of the flowchart ends.

Images in frames other the frame designated by the pointer are, for example, images having dates and time older than the date and time of the image in the designated frame.

According to the embodiment, the following advantages can be obtained.

Compressed images formed by M by N still images captured by the camera unit 3 are stored in the main memory 30. A panoramic entire image, generated from the compressed images stored in the main memory 30, is displayed on the display 2. By using the pointer to designate a desired frame to be updated in the entire image displayed on the display 2, the image in the designated frame is captured by the camera unit 3. The captured image updates the desired frame. This can update only a desired frame in the panoramic entire image. Thus, time intervals at which image updating is performed can be shortened.

One embodiment of the present invention has been described. However, the present invention is not limited to the above embodiment, and can be variously modified based on the technical idea of the present invention.

For example, the values described in the above embodiment are only examples. Different values may be used, if necessary.

In the above embodiment, the mode of the monitoring system may be switched to the multipoint drive mode by the following operation.

At first, a VIEW MODE button 106 is pressed by the pointer. Next, by using the pointer to press the SELECT button 117, a selection screen as described using FIG. 4 is displayed. By designating a frame with the pointer on the selection screen, a desired region for the live mode is selected.

Next, the LIVE MODE button 107 is pressed by the pointer. In the REC MODE selecting menu 118, the selection mode is selected. Finally, the REC button 121 is pressed by the pointer. This switches the mode of the monitoring system to the multipoint drive mode.

What is claimed is:

1. A monitoring system comprising:
a picture capturing unit for performing picture capturing;
a storage unit for storing a plurality of original images comprising a plurality of still images captured by said picture capturing unit, or a plurality of compressed images comprising compressed still images generated by compressing the still images;
an image display unit for performing image display;

a designating unit for designating a region in an image displayed on the image display unit; and a control unit for controlling said image display unit to display a panoramic entire image comprising the stored original images or compressed images, and updating only an image in the designated region in the entire image by an image having a capturing time different from the capturing time of each of the images other than the image in the designated region, wherein each of the images other than the image in the designated region are not updated.

2. A monitoring system according to claim 1, wherein said control unit updates the image in the designated region in the entire image by a plurality of images having different capturing times.

3. A monitoring system according to claim 1, wherein the images other than the image in the designated region have capturing dates and times newer than the capturing date and time of the updated image in the designated region.

4. A monitoring system according to claim 3, wherein the images other than the image in the designated region correspond to images being captured by said picture capturing unit.

5. A monitoring system according to claim 1, wherein the images other than the image in the designated region have capturing dates and times older than the capturing date and time of the updated image in the designated region.

6. A monitoring method comprising:
a picture capturing step for performing picture capturing;
a storage step for storing a plurality of original images comprising a plurality of still images captured in said picture capturing step, or compressed images comprising compressed still images generated by compressing the still images;
a display step for displaying a panoramic entire image comprising the original images or compressed images stored in said storage step;
a designating step for designating a particular region in the entire image displayed in said display step; and
an updating step for updating only the image in the region designated in said designating step by an image having a capturing time different from the capturing time of each of the images other than the image in the designated region,
wherein each of the images other than the image in the designated region are not updated.

7. A monitoring method according to claim 6, wherein, in said updating step, the image in the region designated in the entire image in said designating step is updated by a plurality of images having different capturing times.

8. A monitoring method according to claim 6, wherein the images other than the image in the designated region have capturing dates and times newer than the capturing date and time of the updated image in the designated region.

9. A monitoring method according to claim 8, wherein the images other than the image in the designated region correspond to images being presently captured.

10. A monitoring method according to claim 6, wherein the images other than the image in the designated region have capturing dates and times older than the capturing date and time of the updated image in the designated region.

11. A recording medium having a recorded program for causing a computer to execute:
a picture capturing step for performing picture capturing;
a storage step for storing a plurality of original images comprising a plurality of still images captured in said picture capturing step, or compressed images comprising compressed still images generated by compressing the still images;
a display step for displaying a panoramic entire image comprising the original images or compressed images stored in said storage step;
a designating step for designating a particular region in the entire image displayed in said display step; and
an updating step for updating only the image in the region designated in said designating step by an image having a capturing time different from the capturing time of each of the images other than the image in the designated regions,
wherein each of the images other than the image in the designated region are not updated.

12. A recording medium according to claim 11, wherein, in said updating step, the image in the region designated in the entire image in said designating step is updated by a plurality of images having different capturing times.

13. A recording medium according to claim 11, wherein the images other than the image in the designated region have capturing dates and times newer than the capturing date and time of the updated image in the designated region.

14. A recording medium according to claim 13, wherein the images other than the image in the designated region correspond to images being presently captured.

15. A recording medium according to claim 11, wherein the images other than the image in the designated region have capturing dates and times older than the capturing date and time of the updated image in the designated region.

16. A monitoring system comprising:
a picture capturing unit for performing picture capturing;
a storage unit for storing image data;
an image display unit for performing image display;
a designating unit for designating a region in an image displayed on said image display unit; and
a control unit for controlling said image display unit to display a panoramic entire image comprising a plurality of still images captured by said picture capturing unit, and for controlling said picture capturing unit in accordance with the designated region to capture still images in a position corresponding to the designated region and displaying, in the designated region, an image generated from the still images captured in the positions,
wherein the images other than the image in the designated region have capturing dates and times older than the capturing date and time of an image in the designated region which is updated, and
wherein each of the images other than the image in the designated region are not updated.

17. A monitoring method comprising:
a picture capturing step for performing picture capturing;
a display step for displaying a panoramic entire image comprising a plurality of still images captured in said picture capturing step;
a designating step for designating a particular region in the entire image displayed in said display step; and
a control step for controlling a picture capturing unit in accordance with the particular region designated in said designating step to capture still images in a position corresponding to the designated region, and displaying, in the designated region, an image generated from the still images captured in the positions,
wherein the images other than the image in the designated region have capturing dates and times older than the capturing date and time of an image in the designated region which is updated, and wherein each of the images other than the image in the designated region are not updated.

18. A recording medium having a recorded program for causing a computer to execute:
   a picture capturing step for performing picture capturing;
   a display step for displaying a panoramic entire image comprising a plurality of still images captured in said picture capturing step;
   a designating step for designating a particular region in the entire image displayed in said display step; and
   a control step for controlling a picture capturing unit in accordance with the particular region designated in said designating step to capture still images in a position corresponding to the designated region, and displaying, in the designated region, an image generated from the still images captured in the position,
   wherein the images other than the image in the designated region have capturing dates and times older than the capturing date and time of an image in the designated region which is updated, and
   wherein each of the images other than the image in the designated region are not updated.

19. A recording medium according to claim 18, wherein the images other than the image in the designated region have capturing dates and times older than the capturing date and time of an image in the designated region which is updated.

20. A monitoring system comprising:
   a picture capturing unit to capture a plurality of still image portions that together comprise a panoramic entire image;
   an image display unit to display the panoramic entire image; and
   a control unit to update a designated still image portion of the panoramic entire image with another still image portion captured either at an earlier or later point in time without updating non-designated still image portions of the panoramic entire image.

21. The monitoring system of claim 20, wherein the still image portions are compressed.

22. The monitoring system of claim 20, wherein updating a still image portion comprises updating the still image portion at a predetermined rate.

23. The monitoring system of claim 20, wherein the another still image portion is captured at a later point in time than the non-designated still image portions.

24. The monitoring system of claim 20, wherein the corresponding still image portion is captured at an earlier point in time than the non-designated still image portions.

25. The monitoring system of claim 20, wherein non-designated still image portions are captured at a predetermined rate and not displayed.

26. A method of area surveillance, comprising:
   capturing a plurality of still image portions that together comprise a panoramic entire image of an area;
   designating a first still image portion; and
   displaying the panoramic entire image with the designated first still image portion updated with a corresponding second still image portion captured either at an earlier or later point in time without updating the non-designated still image portions of the panoramic entire image.

* * * * *